United States Patent [19]

Salter et al.

[11] 4,028,732

[45] June 7, 1977

[54] APPARATUS AND METHOD FOR DISPLAY OF IMAGES

[76] Inventors: Lucien Salter, 9 Allee circulaire; Gabriel Maincent, 24 Allee circulaire, both of 27200 Foret de Vernon, France

[22] Filed: Feb. 11, 1976

[21] Appl. No.: 657,281

Related U.S. Application Data

[63] Continuation-in-part of Ser. No. 447,366, March 1, 1974, abandoned.

[30] Foreign Application Priority Data

Mar. 2, 1973 France ............................ 73.07567

[52] U.S. Cl. .............................. 358/289; 346/76 L; 358/264
[51] Int. Cl.² ......................................... H04N 1/06
[58] Field of Search ....................... 178/7.6, 69.5 F; 346/76 L

[56] References Cited

UNITED STATES PATENTS

| 3,569,616 | 3/1971 | Baker | 178/7.6 |
| 3,573,847 | 4/1971 | Sacerdoti | 346/76 L |
| 3,597,536 | 8/1971 | Fowler | 178/7.6 |
| 3,614,312 | 10/1971 | Fournier | 178/7.6 |
| 3,654,624 | 4/1972 | Becker | 346/76 L |
| 3,719,780 | 3/1973 | Gazard | 178/7.6 |

*Primary Examiner*—Howard W. Britton
*Assistant Examiner*—Michael A. Masinick

[57] ABSTRACT

An image display method and apparatus in which a laser beam is modulated to vary in intensity in response to electric or electromagnetic signals received and is traversed along a photosensitive film carried on a rotating carriage by means of a stepwise driven, friction damped carriage synchronized with respect to the drum rotation, the drum being mounted on magnetic bearings for rotation about a preferably vertical axis. Optionally the modulated beam may be split and a part of the split beam used as a feedback signal controlling the modulation for compensating for the intensity of the beam emerging from the laser.

19 Claims, 4 Drawing Figures

APPARATUS AND METHOD FOR DISPLAY OF IMAGES

REFERENCE TO RELATED APPLICATION

This application is a continuation-in-part application of the application of Lucien Salter et al. entitled "Apparatus and Method for Display of Images" filed Mar. 1, 1974 under Ser. No. 447,366, now abandoned, the entire disclosure of which is incorporated herein by reference.

The present invention relates to a method and apparatus for displaying an image transmitted in the form of electric or electomagnetic signals.

It is already known to tele-transmit images in the form of electric or electromagnetic signals. These signals are then received by an apparatus for displaying the image, such as for example a television receiver or a belinograph.

In particular, it has already been proposed to provide such an apparatus for displaying an image by means of a beam of light emitted from a source formed by a laser and which produces an image on a photo-sensitive film applied to the cylindrical surface of a rotary drum after having passed through a static modulator, such as an acoustic-optical modulator, and having been reflected by a reflector integral with a carriage which is movable parallel to the axis of the drum.

It has even been proposed to extract part of this beam of light by means of a semi-transparent reflector and to make use of this extracted portion for suitably controlling the modulation of the acoustic-optical modulator.

In this known apparatus the received signals control on the one hand the rotation of the drum and the displacement of the carriage which are thus synchronised, and on the other hand the acoustic-optical modulator through the intermediary of which the signals determine the degree of darkness of every point of the image.

Nevertheless, this known apparatus is not really satisfactory since, given the slow rate of rotation permitted by the mechanical bearings on which the rotary drum to which the photo-sensitive sheet is applied in this known apparatus, the frequency and thus the duration of restoration of the image is clearly linked to the drum rotation velocity owing to the fact that completion of one line of said image occurs in each revolution of the drum, it has not yet proved possible to build up a really clear image, i.e. an image of a suficiently great number of lines in a sufficiently brief period of time.

According to one aspect of the present invention, there is provided apparatus for displaying an image tele-transmitted in the form of electric or electromagnetic signals comprising a light source, means for directing a beam of light from said light source towards the cylindrical surface of a drum rotating about its axis of revolution, a control element, responsive to the electric or electromagnetic signals to vary the intensity of said beam of light as a. function of the said signals, a diaphragm placed in the path of said beam, and a carriage driveable for translational movement parallel to said axis to intercept said beam on a part of its path parallel to said axis, and deflecting it perpendicular to its initial direction while focusing the image of the diaphragm at the point of impact of said beam on said drum, the drum being mounted on magnetic bearings and the carriage being driven in stepwise manner, controlled by signals from the same source as those which control the rotation of the drum, said carriage further comprising friction means for damping out and rapidly stabilise the carriage position at the end of each forward step.

According to a second aspect of the present invention there is provided a method of displaying an image tele-transmitted in the form of electric or electromagnetic signals comprising using a laser to produce a beam of light to form an image on a photosensitive film applied to the cylindrical surface of a drum which rotates about its axis of revolution, using a static modulator to vary the luminous intensity of said beam as a function of said signals and controlling its point of impact on said film by means of a carriage moving stepwise parallel to the axis of rotation of said drum and controlled from a series of pulses which also control rotation of the drum to synchronise the drum and carriage at the rate of one step per revolution, supporting the drum on magnetic bearings and driving it to rotate at a speed of at least 800 r.p.m., and maintaining each movement step of the carriage at less than 20 microns, and damping said carriage for rapidly stabilishing its position at the end of each of its forward steps.

A first advantage of the present invention resides in that as the drum carrying the photosensitive film is mounted on magnetic bearings, and the stepwise carriage movement is rapidly damped and stabilised, it becomes possible to cause the drum to rotate at a very high angular velocity which enables a light spot of very small size to be used and consequently derive an image of excellent definition without prolonging excessively the duration of the line scan and thus of the transmission.

In order that the present invention may more readily be understood the following description is given, merely by way of example, with reference to the accompanying drawing in which.

Figure 1:
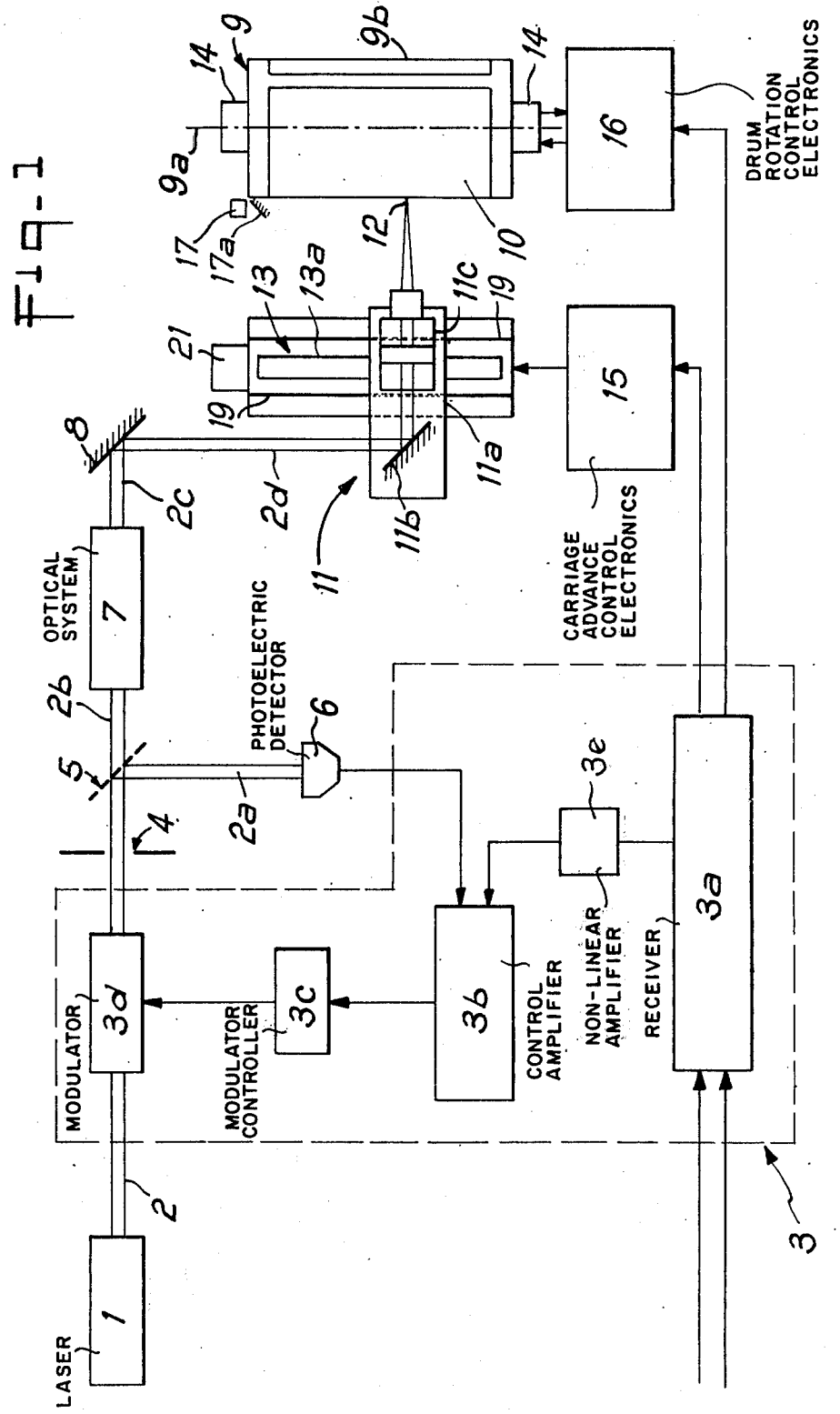
FIG. 1 is a block diagram of an exemplary display apparatus according to the present invention.
Figure 2:
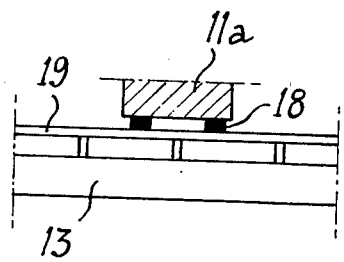
FIGS. 2 and 3 show two possible forms of a damper.
Figure 3:
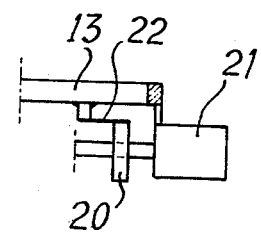

As can be seen in FIG. 1 the image display apparatus according to the invention essentially comprises a source of light, in the form of a laser 1 which emits a beam 2 the slight divergence of which enables a very great concentration of luminous energy to be obtained, and consequently a spot of a very high degree of illumination originates from the source. The laser may more particularly be a red laser of helium-neon type and emitting a radiation of 0.635 micron wavelength or a blue, argon laser emitting a radiation of 0.488 or 0.514 micron wavelength.

A control unit generally designated 3 comprises a receiving element 3a which is intended to receive the modulated electrical or electromagnetic signals in the form of which the image is transmitted to the display apparatus and is connected through the intermediary of a non-linear amplifier 3e of variable gain to a control amplifier 3b which sends the amplified signals to a pilot controller 3c which controls a static modulator 3d of acoustic-optic or electric-optic with no moving parts, placed in the path of the laser beam 2.

The non-linear, variable gain amplifier 3e follows an exponential law and is intended to compensate the non-linear response characteristic of the photosensitive film used. In the range employed, the optical density of the film is substantially a linear function of the logarithm of illumination of said film.

An optical diaphragm 4 enables the beam emergent from modulator 3d to be isolated (which ensures the possibility of total extinction of the beam). This beam is then divided by a semi-transparent plate 5 into two parts: one part 2a of which feeds back to the control amplifier 3b to allow the luminous intensity of the beam to be controlled through the imtermediary of a photoelectric detector 6 connected to the control amplifier 3b. The other part 2b of the split beam is employed for producing an image on the film.

An optical system 7 for forming the spot 12 on the film comprises an optic for focusing the laser beam 2b on a diaphragm and a collimation optic obtaint in the form of an afocal system consisting of two doublets each comprised of two coupled lenses and a spatial filter consisting of a diaphragm of about 20 microns diameter inserted in a thin metallic support which is mounted in a frame capable of being precisely centred on the optical axis of the system. The resulting beam 2c is thus a beam of parallel light and is reflected by a mirror 8 positioned in such manner that the reflected beam 2d is parallel to the axis of revolution 9a of a film support drum 9 which rotates about its vertical axis of symmetry 9a and has the sensitive sheet or film 10 applied to its cylindrical surface 9b.

The beam 2d is recaptured by the optical outfit of the movable carriage 11a on a table 11. By virtue of a mirror 11b and a collimating optic 11c an image spot 12 of the diaphragm is focussed on the receiving film 10. The collimating optic 11c is an optic of variable focal length formed of two lenses at least one of which is axially movable relative to the other, thus enabling the diameter of the image spot 12 on the film 10 to be adjusted. The beam is thus transmitted towards the film 10 on the drum by being directed radially inwardly of the drum, i.e. in the plant which includes the drum axis 9a and the beam portion 2d. The forwarding table comprising the movable carriage 11a mounted in a slideway 13a which extends along the chassis 13 of the table in a direction parallel to the axis of rotation 9a, is driven by a feed-screw and a stepping motor, not shown, which ensure the displacement of the spot following a direction parallel to the drum axis 9a.

An optical system 17 comprising a mirror 17a inclined at 45° with respect to the axis 9a of the drum 9 is placed at one of the ends of the path of the movable carriage 11a and permits the spot 12 to be displayed on a screen (not shown) when the said carriage 11a is at the end of the corresponding course, so that perfect focusing of the spot on the photosensitive film 10 can be monitored.

The visual display of an image is thus obtained in accordance with the following procedure. A line is scanned with the carriage 11a stationary, and the drum 9 rotating on magnetic bearings 14. The film 10 on the drum has been pre-cut to the desired format. General synchronising is provided by means of a succession of pulses. Thus, at the end of every line a synchronising pulse is sent to the control electronics 15 of the table which, through the intermediary of logic circuits, ensures the advance of the carriage by one step while the drum 9 continues to rotate so that the carriage passes from one line to the next as well as ensuring return of the carriage 11a to its original position at the end of the image, the carriage 11a moving through one step for each revolution of the drum 9. At the end of each forward steps, equal to the diameter of the spot, the oscillations of the carriage 11a about its new position are damped out so that the said new position is very quickly stabilised in such manner as to limit the time required for passing from one line to the next line to a time of less than 7 milliseconds.

The friction damping means consist of a shoe 18 of Teflon or similar material which is integral with the movable carriage 11a and cooperates with and rubs on a rail 19 which is integral with the chassis 13 of the table and placed parallel to the slideway 13a of the table. Alternatively the friction damping means may be a runner in the form of a cylindrical ring 20, also of Teflon or an analogous low-friction material, coaxially mounted integral with the rotor of the stepping motor 21 which actuates the feed-screw and on which ring a stationary finger 22 integral with the chassis 13 rubs.

The synchronised pulse is also sent to the control electronics 16 of the magnetic bearings 14, so as to control the speed and phasing of rotation of the drum 9. This control is obtained by phase comparison between the synchronising signal and a signal which is generated by the drum 9 to give a reference of its own position. The receiving element 3a furthermore comprises a control desk and thus makes it possible to either reconstruct the signal received from outside or to effect a monitoring of the operation of all the apparatus by reconstructing a grey scale or a checker-board furnished by an internal image simulator.

The photometric characteristics desired determine the choice of the various elements.

An advantage of the present apparatus resides in the fact that the modulator 3d placed in the beam 2 from the laser 1 permits the luminous intensity of said beam to be varied in continuous manner in time, which makes it possible to have an absolutely continuous gradual range of shades along one and the same line of the grid. This is clearly very interesting when compared to the image display apparatuses in which the scanning was effected by successive and therefore intermittent imaging of the film by blobs of dimensions equalling those of the spot 12. Such blobs, however small they may be, are each of a uniform shade over all their surface and therefore do not enable a similar resolution of image to be attained.

Figure 4:
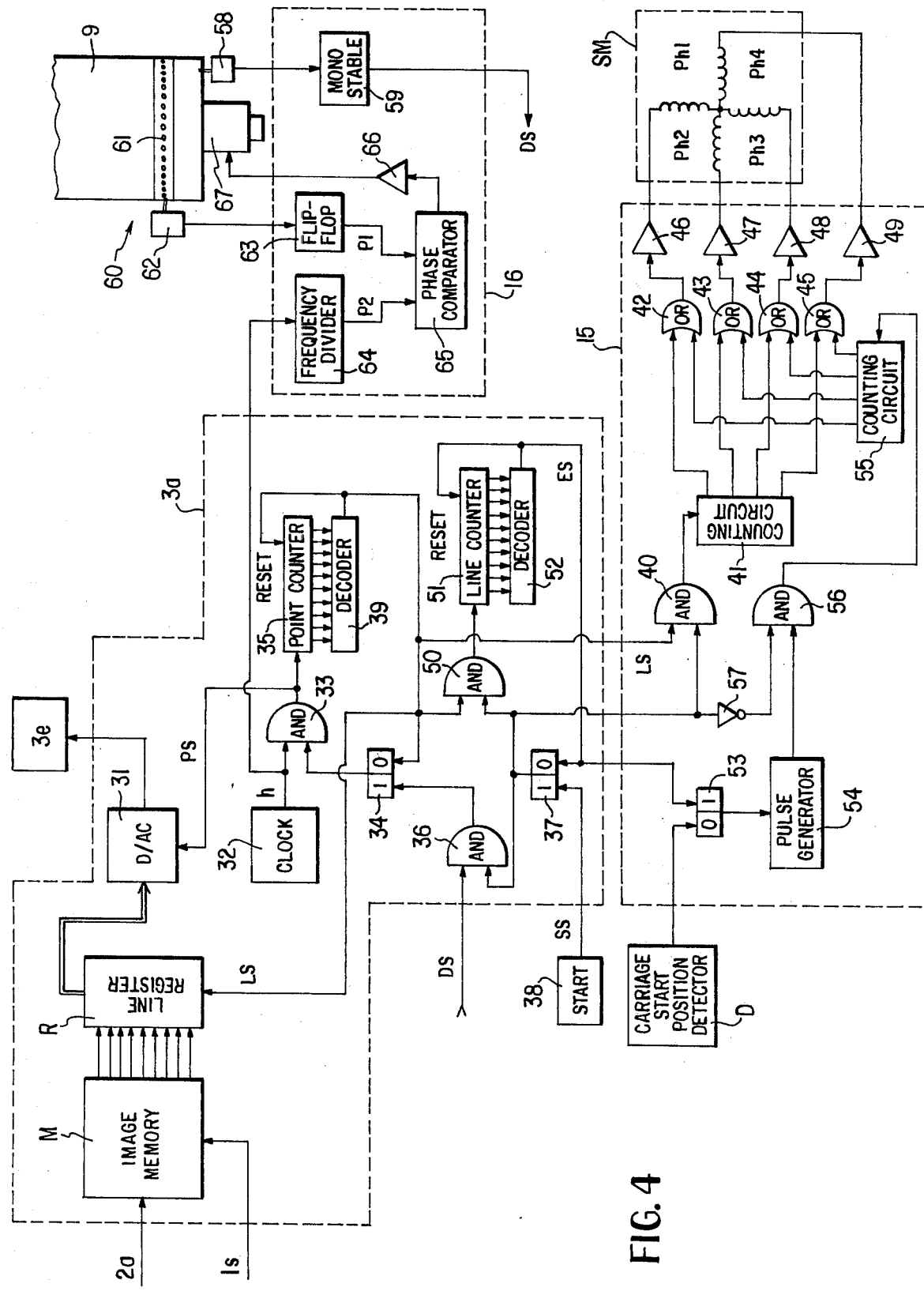
FIG. 4 is a schematic, block diagram of preferred control and receiving circuits useable in the apparatus of FIG. 1.

Referring now to FIG. 4, which shows the details of receiver 3a and the control electronic 15 and 16, an image 2a is transmitted in the form of successive signals, each representing the intensity of an image point, together with line synchronizing pulses $ls$, these successive signals being generated by scanning the original image line by line.

The received signals are converted into digital form, unless they are transmitted in this form, and the received image information is stored line by line in a memory M of the receiving circuit 3a under the control of the received line synchronizing pulses $ls$.

The information representative of each image line is extracted from the memory M and stored in a buffer register R under the control of a line-synchro pulse LS generated by the receiving circuit 3a. The register R stores an amount of point information equal to the number N of points per line of image, this point information being successively extracted from the register R under the control of point-synchro pulses PS generated by the receiving circuit 3a. The successively extracted point information is fed to a digital-analog converter 31 which output is connected to the amplifier 3e.

The receiving circuit 3a includes a clock-generator 32 which generates a series of clock pulses h of fixed frequency. An AND gate 33 has a first input connected to the clock generator 32, a second input connected to the output of a bistable element 34 and an output connected to the input of a point counter 35.

The clock pulses h are fed to the counter 35 through the gate 33 when the output of the bistable element 34 is set to a high logical level in response to a signal delivered by an AND gate 36. The latter receives on a first input a reference signal DS, indicating that the drum 9 (FIG. 1) is in a predetermined angular position, and has a second input connected to the output of a bistable element 37. The output of the bistable element 37 is set to a high logical level in response to the reception of a start signal 55 generated by an actuator 38 upon actuation thereof by the operator.

After generation of the start signal SS and subsequent reception of a signal DS, clock pulses h are fed to the counter 35 through the AND gate 33. The output of the AND gate 33 is connected to the digital-analog converter 31 and delivers the point-synchro pulses PS for controlling the successive extraction and conversion of the point information stored in the register R. This extraction is then accomplished at a frequency fp equal to the clock pulses h frequency.

A decoding circuit 39 is connected to the point counter 35 and generates an output signal when the content of this counter reaches a value equal to the number N of points per line of image. The decoding circuit 39 can be preset to the desired value before each image display by the operator. The output signal of the decoder 39 resets to zero the point counter 35, resets the bistable element 34 to close the AND gate 33 and constitutes the line synchro-pulse LS which is fed to the register R to control the storing of a new line information. This new line information is then extracted point by point after reception of a new reference signal DS and translation of the carriage 11a (FIG. 1) by one step.

The translation of the carriage 11a by one step so that it passes from one line to the next is controlled by the control circuit 15 which receives each line synchro pulse LS. An AND gate 40 has a first input connected to the output of the decoder 39, a second input connected to the output of the bistable element 37 and an output connected to the input of a counting circuit 41. The bistable element 37 being set in response to the start signal SS, each pulse LS is fed to the counting circuit 41 through the AND gate 40.

The carriage is driven by means of a stepping motor SM having for example four phases Ph1, Ph2, Ph3 and Ph4. The counting circuit 41 has four outputs connected to the four phase windings through OR gates 42,43,44 and 45, and amplifiers 46,47,48 and 49 respectively. At the end of every line, a pulse LS is fed to the counting circuit 41. The outputs of the counting circuit 41 are then successively and cyclically energized in response to the successive pulses LS to ensure successive progression of the carriage 11a by one step corresponding to an elementary motor step.

The line-synchro pulses LS are also fed to a first input of an AND gate 50 having a second input connected to the output of the bistable element 37 and an output connected to the input of a line counter 51. The bistable element 37 being set in response to the start signal SS, the successive line-synchro pulses LS are counted by the counter 51. A decoding circuit 52 is connected to the counter 51 and generates an output signal when the content of this counter reaches a value equal to the number of lines of image. The decoding circuit 52 can be preset to a desired value before each image display by the operator. The output signal of the decoder 52 constitutes an end signal ES which resets to zero the counter 51 and resets the bistable element 37 to close the AND gates 36, 40 and 50, the whole image being displayed.

Connections not shown ensure the setting to zero of the counters 35 and 51 and the storing of the first line information into the register R in response to the start signal SS.

In response to the end signal ES the output of a bistable element 53 is set to a high logical level, whereby a pulse generator 54 is energized and delivers pulses to a counting circuit 55 through an AND gate 56 which has a first input connected to the output of the bistable element 37, through an inverting element 57, a second input connected to the output of the pulse generator 54 and an output connected to the input of the counting circuit 55. The counting circuit 55 has four outputs connected to the phase windings of the stepping motor SM through the OR gates 45,44,43 and 42, and the amplifier 49,48,47 and 46, respectively, in order to ensure, in response to the end signal ES, a quick return of the carriage 11a to its original start position, the order of energization of the motor phase windings being reversed.

The pulse generator 54 is for instance a monostable circuit energized in response to the setting of the bistable element 53, the latter being reset and the pulse generator 54 deenergized in response to a signal generated by a position detector D when the carriage 11a has returned to its original start position.

The reference signal DS is generated by means of a fixed detector 58 which delivers an output signal during each revolution of the drum 9 when the latter is in a predetermined angular position. The detector 58 may be of the magnetic type cooperating with a ferromagnetic element fixed to the drum 9 or of the optic type. The output signal of the detector 58 is converted into a pulse DS of fixed duration by means of a monostable circuit 59 of a control circuit 16. Each line display is then initiated by the drum 9 itself whereby the starting points of all the lines are accurately aligned along a drum generating line.

The control circuit 16 performs the control of the speed of rotation of the drum 9 which is driven by means of a synchronous motor (not shown). A speed transducer 60 of the optic type comprises an annular element 61 fixed to the drum and provided with circumferentially equally spaced holes through which light successively falls on an optic detector 62 when the drum 9 rotates. The output signal of this detector is converted into a series of square pulses P1 by means of a bistable circuit 63.

A reference speed signal in the form of a series of square pulses P2 is generated by a frequency dividing circuit 64 which receives the clock pulses h.

Signals P1 and P2 are fed respectively to the first and second input of a phase comparator 65. If the frequencies of signals P1 and P2 are different, the phase comparator generates an error signal which is amplified by means of an amplifier 66 and which controls an eddy-current brake 67 acting upon the drum 9.

The speed of rotation ω of the drum 9 is tied to the frequency $f_p2$ of the pulses P2. This speed ω, in r.p.m., is chosen higher than $N \cdot f_p$, where N is the number of points per line of image and $f_p$ the frequency of the point-syhchro pulses PS in order to ensure the completition of each line display during each drum revolution. The speed being predetermined, the frequency $f_p2$ is chosen equal to $N_1 \cdot \omega$ where $N_1$ is the number of pulses P1 generated during each drum revolution, this number $N_1$ being constant and determined by the structure of the speed transducer 60.

Practically, the drum 9 is driven by means of a synchronous motor having a nominal speed higher than the predetermined rotation speed ω to allow the drum speed to be increased as well as decreased.

A monitoring of the operation of all the display apparatus may be accomplished by reconstructing a grey scale of a checkerboard furnished by an internal image simulator which may be in the form of an image memory and which can be connected to the line register R instead of the memory M.

The present invention, of course, also relates to the method which corresponds to steps carried out in the above described apparatus and which comprises displaying an image tele-transmitted in the form of electric or electromagnetic signals by producing, by the action of a beam of light, an image on a photosensitive film applied to the cylindrical surface of a drum which rotates about its axis of revolution, the beam on the one hand having its luminous intensity varied as a function of said signals and on the other hand having its point of impact on said film varied by means of a carriage moving parallel to the axis of rotation of said drum. This method is particularly remarkable in that the said drum is caused to rotate at a speed equalling at least 800 r.p.m., with a movement step of the carriage of less than some 20 microns, owing to magnetic bearings on which said drum is mounted and friction and damping means intended to stabilise very rapidly the position of said carriage at the end of each of its advancing steps.

The present invention is not limited to the embodiment which has been described by way of example but on the contrary covers any modifications which can be obtained within the framework of the accompanying claims. Thus, it is in particular possible to employ a photosensitive film 10 which can be hot developed, without the necessity of using a free photographic bath for developing.

Clearly the above described visual display apparatus is capable of, on the one hand, producing a spot the diameter of which is from a few microns to the order of 20 microns while the surface to be affected by said spot is scanned along parallel lines spaced from one another by the diameter of the spot. On the other hand, such scanning has a rapid frequency of at least 800 lines each of 14,000 points per minute. The apparatus is then altogether capable of building up for example an image band of 28 cm. length by 16 mm width in every minute, corresponding to a raster of said band of 500 lines per cm. without this example of course representing a limit of the performance of which the present apparatus is capable.

We claim:

1. An apparatus for displaying an image tele-transmitted in the form of electric or electromagnetic signals, the image being formed by a plurality of parallel lines each comprising a plurality of points, the apparatus comprising a drum having a cylindrical surface; magnetic bearing means supporting said drum for rotation about its axis of revolution; a carriage; carriage driving means for driving said carriage in stepwise manner for translational movement parallel to said axis of said drum; friction means for damping out and rapidly stabilising the carriage position at the end of each movement step; a light source; beam directing means for directing a beam of light from said light source towards said cylindrical surface of said drum; an optical system disposed to lie in the path of the beam from said light source, said beam directing means including means for transmitting the beam along a path parallel to said axis in a direction towards said carriage, means carried on said carriage for intercepting the beam in said path and for deflecting it perpendicularly to said drum axis in a direction towards said drum and means for focusing an image formed in said optical system at the point of impact of the beam on said drum; receiving means responsive to the electric or electromagnetic signals for providing signals representative of an image to be displayed and first synchronizing signals; a light intensity modulator connected to said receiving means to vary the intensity of the beam of light as a function of the signals representative of the image to be displayed; first control means connected to said receiving means and to said carriage driving means to control stepwise movement of said carriage in response to the first synchronzing signals; and second control means connected to said receiving means to control the speed of rotation of said drum.

2. An apparatus as set forth in claim 1, wherein said second control circuit comprises a speed transducer for delivering a signal representative of drum rotation speed, a speed reference signal generator for delivering a signal representative of a predetermined rotation speed, a coomparator having two inputs connected respectively to said speed transducer and to said speed reference signal generator for delivering an error signal representative of the difference between the drum rotation speed and the predetermined rotation speed and an eddy-current brake acting upon said drum for controlling the speed thereof in response to the error signal.

3. An apparatus as set forth in claim 1, including a non-linear amplifier having an input connected to said receiving means for receiving the image representative signals and an output connected to said light intensity modulator.

4. An apparatus as set forth in claim 1, including an optical system placed at an end of travel of said carriage for displaying the focussed spot.

5. An apparatus as set forth in claim 1, wherein said beam deflecting means on said carriage is disposed to deflect the beam of light towards said drum substantially following a direction extending radially of said drum.

6. An apparatus as set forth in claim 1, wherein said axis of revolution about which said drum may rotate is vertical.

7. An apparatus as set forth in claim 1, further comprising a semi-transparent plate placed to receive the beam of light as it travels between said source and said drum to split the beam, a photo-electric detector disposed to receive part of the split beam, and feedback means electrically connecting said photoelectric detector to a control means, said control means having an output coupled to said modulator for stabilising the intensity of the beam of light which emerges from said modulator.

8. An apparatus as set forth in claim 1, wherein said receiving means includes first synchronizing means for delivering said first synchronizing signals; storage means connected to said first synchronizing means for successively storing the information relative to each image line in response to successive first synchronizing signals; second synchronizing means for delivering second synchronizing signals; and means connected to said second synchronizing means and to said storage means for delivering, to said light intensity modulator, successive signals representative of the intensities of the image points of the stored image line, in response to successive second synchronizing signals, said first synchronizing means being connected to said second synchronizing means for delivering a said first synchronizing signal at the end of each line display.

9. An apparatus as set forth in claim 8, including detecting means for delivering a drum angular position reference signal indication that said drum is in a predetermined angular position about its axis and wherein said second synchronizing means comprises a pulse generator and a gate circuit having a first input connected to an output of said pulse generator, a second input connected to said detecting means and an output, for delivering said second synchronizing signals in form of a series of pulses in response to said drum angular position reference signal.

10. An apparatus as set forth in claim 9, wherein said receiving means comprises a point counter for receiving said second synchronizing signals and counting them, a decoder connected to said point counter for delivering the first synchronizing signal when the number of counted second synchronizing signals reaches a predetermined value equal to the number of points per line of image, and a bistable circuit having a first input connected to said decoder, a second input connected to said detecting means and an output connected to said second input of said gate circuit for closing said gate circuit in response to the first synchronizing signal at the end of a line display and subsequently opening the same in response to the reference signal for controlling the beginning of the next line display.

11. An apparatus as set forth in claim 1, wherein said carriage drive means comprises a stepping motor.

12. An apparatus as set forth in claim 4, wherein said stepping motor is a multiple phase motor and wherein said first control means comprises a first counting circuit having a plurality of outputs of a number equal to the number of motor phases and each connected to a respective motor phase winding, said first counting circuit having an input connected to said receiving means for receiving said first synchronizing signals in order to ensure movement of said carriage in successive steps in a first direction upon energization of successive outputs of said first counting circuit in response to successive first synchronizing signals.

13. An apparatus as set forth in claim 12, wherein said receiving means comprises a line counter for receiving said first synchronizing signals and counting them and a decoder connected to said line counter for delivering an end signal when the number of counted first synchronizing signals reaches a predetermined value equal to the number of image lines, and wherein said first control means comprises a pulse generating circuit connected to an output of said decoder for generating pulses in response to the end signal, a second counting circuit having an input connected to said pulses generating circuit and a plurality of outputs of a number equal to the number of motor phases and each connected to a respective motor phase winding in order to ensure return movement of said carriage, after the end of an image display, in a second direction opposite to the first direction upon successive energization of the outputs of said second counting circuit in response to said pulses.

14. An apparatus as set forth in claim 1, including a table on which said carriage moves, and a rail integral with said table, said friction means comprising shoes integral with said carriage and cooperating with said rail.

15. An apparatus as set forth in claim 14, wherein said shoes are made of polytetrafluoroethylene.

16. An apparatus as set forth in claim 1, including a table on which said carriage is supported; and wherein said carriage drive means comprise a stepping motor; and said friction means comprise a ring integral with the rotor of said stepping motor and a finger integral with said table and disposed to engage said ring.

17. An apparatus as set forth in claim 16, wherein said shoes are made of polytetrafluoroethylene.

18. A method of displaying an image tele-transmitted in the form of electric or electromagnetic signals comprising the steps of (a) applying a photosensitive film to the cylindrical surface of a drum which rotates about its axis of revolution, (b) using a laser to produce a beam of light to form an image on said film, (c) using a static modulator to vary the luminous intensity of said beam as a function of said signals and traversing its point of impact on said film by means of a travelling carriage moving parallel to the axis of rotation of said drum, (d) controlling said carriage and controlling rotation of the drum from a series of pulses which synchronise the drum and carriage at the rate of one step per revolution, (e) supporting the drum or magnetic bearings and driving it to rotate at a speed of at least 800 r.p.m., (f) maintaining each movement step of the carriage at less then twenty microns, and (g) damping said carriage for rapidly stabilising its position at the end of each of its forward steps.

19. A display method as set forth in claim 18, wherein the photosensitive film is one which can be hot developed without free photographic bath.

* * * * *